No. 836,302. PATENTED NOV. 20, 1906.
S. S. CHILDS.
VEHICLE WHEEL.
APPLICATION FILED MAY 29, 1905.

WITNESSES:
Ralph Lancaster.
Russell M. Everett.

INVENTOR:
Samuel S. Childs,
BY
Charles H. Pell,
ATTORNEY.

UNITED STATES PATENT OFFICE.

SAMUEL S. CHILDS, OF BERNARDSVILLE, NEW JERSEY.

VEHICLE-WHEEL.

No. 836,302.　　　　　Specification of Letters Patent.　　　　Patented Nov. 20, 1906.

Application filed May 29, 1905. Serial No. 262,715.

*To all whom it may concern:*

Be it known that I, SAMUEL S. CHILDS, a citizen of the United States, residing at Bernardsville, in the county of Somerset and State of New Jersey, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the numerals of reference marked thereon, which form a part of this specification.

The objects of this invention are to provide an automobile or other vehicle wheel with an elastic tire of great durability and general efficiency which will be, however, less expensive than the rubber tires now in vogue and one which may be repaired in the event of damage with ease, and to secure other advantages and results, some of which will be hereinafter referred to in connection with the description of the working parts.

The invention consists in the improved vehicle-wheel and in the arrangements and combinations of parts of the same, all substantially as will be hereinafter set forth, and finally embraced in the claim.

Figure 1:
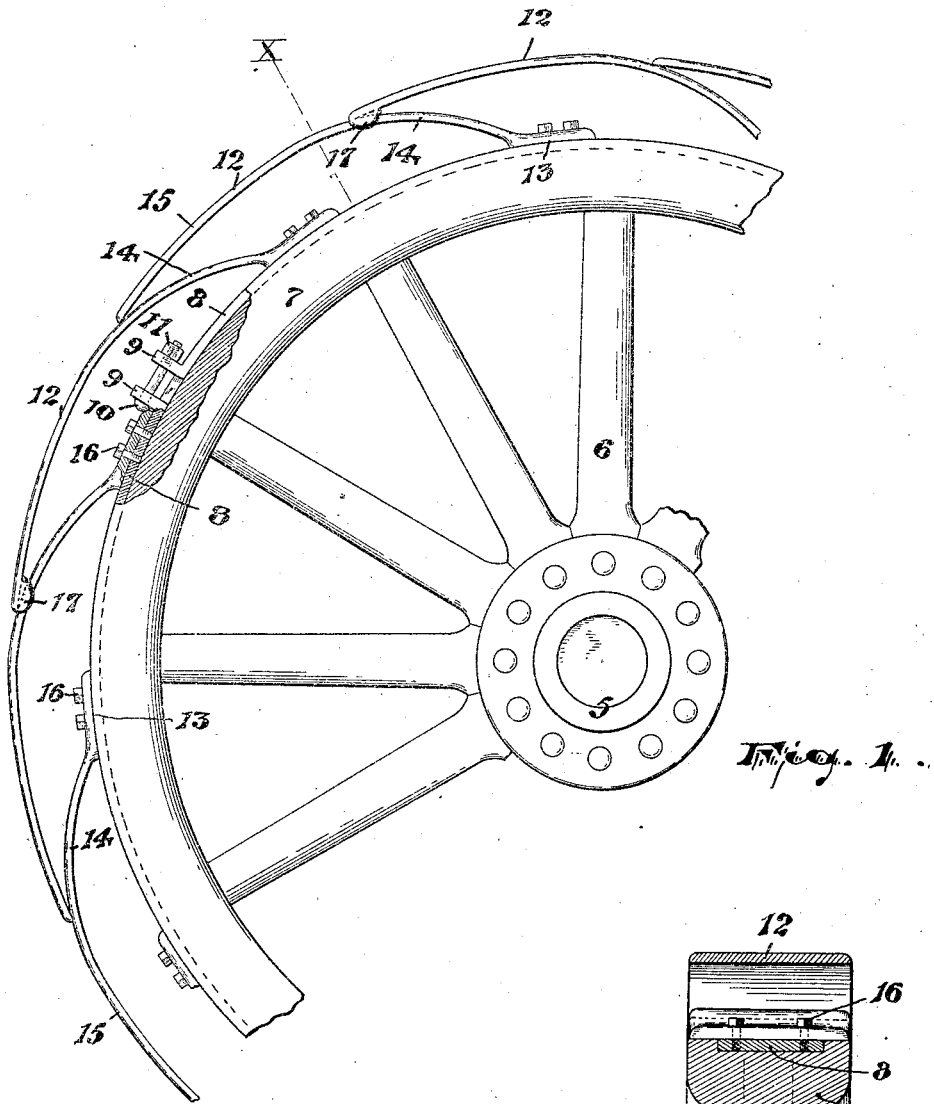
Figure 2:
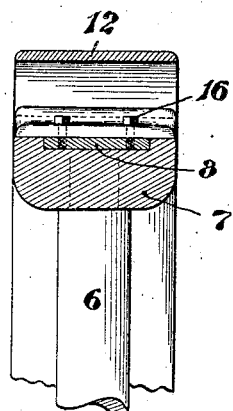

Referring to the accompanying drawings, in which like numerals of reference indicate corresponding parts in each of the figures, Figure 1 is a side elevation of a portion of a wheel of my improved construction; and Fig. 2 is a section of the same, taken at line X.

In said drawings, 5 indicates the hub and axle of the improved wheel, 6 the spokes thereof, and 7 represents the rim or felly. These may be of any ordinary construction, of wood or metal, or combinations of such or other materials.

In the preferred construction the rim 7 is peripherally grooved to receive the base-piece 8 of the tire, which base-piece may be separably fastened upon said rim in the manner indicated in Fig. 1, where the ends of said base-piece are turned, as at 9 9, to form ears, which are perforated to receive a bolt 10. A nut 11 serves to hold said bolt in said ears and the base-piece firmly in said groove, and said parts may be tightened from time to time should there be any shrinkage or wear to be taken up in the wheel.

The base-piece 8 serves as a foundation or support for a series of springs 12 12 12, which are curved to extend away from the rim and form an elastic tread-surface for the wheel. Said springs at their inner ends are formed to provide bearing-surfaces 13, by which they may be properly seated upon the base 8, and said springs at said bearings are preferably removably seated upon said base, so that should one of the springs break it may be at once replaced with convenience and ease, extra springs being presumably carried in the vehicle. I may employ bolts or screws 16 of any ordinary kind in fastening these springs upon the base, or said springs may be riveted in place or locked by lock-nuts in any proper manner. From the bearing 13 of said springs the said springs curve outwardly, as at 14, and toward their free extremities lie in positions approximately concentric with the periphery of the rim 7, as at 15, the free extremity overlapping and each spring engaging the spring next in succession, as indicated in Fig. 1, to form a continuous elastic tread-surface. I prefer to form at the said free overlying extremities of the springs at the opposite sides thereof keeper-lugs 17, (shown in Fig. 1,) which engage the opposite side edges of the next spring of the series to hold the springs in the proper alinement or prevent lateral displacement. I may, however, dispense with such lugs as indicated in connection with certain of the springs of Fig. 1.

Having thus described the invention, what I claim as new is—

An improved wheel comprising a wheel portion, a detachable band on the rim of the wheel, and a series of leaf-springs on the band having their free ends bent concentric to the wheel and having the free end of each spring in contact with the next succeeding spring.

In testimony that I claim the foregoing I have hereunto set my hand this 24th day of May, 1905.

SAMUEL S. CHILDS.

Witnesses:
　CHARLES H. PELL,
　RUSSELL M. EVERETT.